United States Patent
Imamura et al.

(10) Patent No.: US 7,522,360 B2
(45) Date of Patent: Apr. 21, 2009

(54) FLYING HEIGHT MEASUREMENT APPARATUS AND METHOD THEREFOR

(75) Inventors: Takahiro Imamura, Kawasaki (JP); Toru Yokohata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 242 days.

(21) Appl. No.: 11/480,835

(22) Filed: Jul. 6, 2006

(65) Prior Publication Data

US 2007/0211361 A1 Sep. 13, 2007

(30) Foreign Application Priority Data

Mar. 9, 2006 (JP) .............................. 2006-064944

(51) Int. Cl.
*G11B 27/36* (2006.01)
*G11B 21/02* (2006.01)
(52) U.S. Cl. .......................................... 360/31; 360/75
(58) Field of Classification Search ....................... None
See application file for complete search history.

(56) References Cited

U.S. PATENT DOCUMENTS

| | | | | |
|---|---|---|---|---|
| 4,777,544 A | * | 10/1988 | Brown et al. | 360/75 |
| 5,377,058 A | * | 12/1994 | Good et al. | 360/75 |
| 5,410,439 A | * | 4/1995 | Egbert et al. | 360/75 |
| 6,249,393 B1 | * | 6/2001 | Billings et al. | 360/31 |
| 6,735,027 B2 | * | 5/2004 | Helsel et al. | 360/31 |
| 6,765,745 B2 | * | 7/2004 | Smith et al. | 360/75 |
| 7,016,131 B2 | * | 3/2006 | Liu et al. | 360/31 |
| 2005/0024761 A1 | * | 2/2005 | Lou et al. | 360/75 |
| 2006/0103959 A1 | * | 5/2006 | Lu | 360/31 |

FOREIGN PATENT DOCUMENTS

| | | |
|---|---|---|
| CN | 1090078 A | 7/1994 |
| JP | 6-223523 | 8/1994 |

* cited by examiner

*Primary Examiner*—Jason C Olson
(74) *Attorney, Agent, or Firm*—Kratz, Quintos & Hanson, LLP.

(57) ABSTRACT

Provided is a new apparatus for measuring a flying height of a head requiring none of a specific magnetization pattern, that is, a head flying height measurement apparatus for use within a disk drive including a reading head, including: a signal replay unit 300 for replaying a signal from the reading head; filter units 320 and 322, being connected to the signal replay unit, for filtering the replayed signal; amplitude detection units 330 and 332, being connected to each of the filter units, for detecting a maximum amplitude or a representative value close thereto from the filtered replayed signal; and a calculation unit 340 for calculating a flying height of the reading head within the disk drive by using the maximum amplitude, or the representative value close thereto, which is detected by the amplitude detection unit.

15 Claims, 6 Drawing Sheets

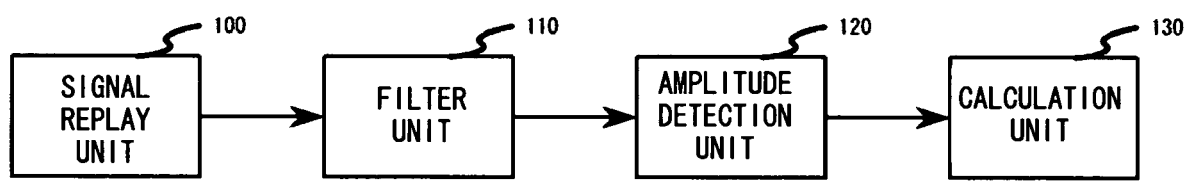
F I G. 1

FLYING HEIGHT MEASUREMENT APPARATUS AND METHOD THEREFOR

BACKGROUND OF THE INVENTION

1. Field of the Invention

The present invention relates to a measurement apparatus and its method for a flying height of a disk drive head.

2. Description of the Related Art

Various methods, such as optical interference, have conventionally been adopted for measuring a flying height of a reading head from a recording surface (i.e., a magnetic layer) for a disk drive.

In the case of measuring a flying height of a head on a track by using a simple output amplitude such as a conventional technique called TAA (Track Averaged Amplitude; i.e., an average amplitude of one round of a track), et cetera, measurement errors may be induced by output changes due to an off-track displacement of the head and/or a secular change of an output sensitivity.

In order to solve the above described problem, proposed is a method called a Triple Harmonic Method for measuring a flying height of ahead. The triple harmonic method is one for recording a specific magnetization pattern (e.g., "1, 1, 1, 1, 0, 0") so as to include many linear harmonic components and cubic harmonic components of waves in a hard disk in advance, and measure a head flying height by reading an amplitude ratio of components of the magnetization pattern.

The above described triple harmonic method, however, requires a process for writing a specific-use magnetization pattern in advance to a hard disk as the target of measuring a head flying height, and therefore faced with the problem of increased processes. Another problem is that an effective recording zone of a hard disk product reduces because the above described specific-use magnetization pattern occupies a part of the recording zone of the hard disk.

Considering the above described problem, the present invention aims at providing an apparatus, and the related method and program which are capable of providing a new measurement of a head flying height which does not require a specific-use magnetization pattern.

SUMMARY OF THE INVENTION

FIG. 1 is an illustration relating to the principle of a measurement of a head flying height according to the present invention. A reading head within a disk drive reads information from a recording surface of a hard disk so that a signal replay unit 100 receives it for replaying a signal. The signal is then transmitted to a filter unit 110 for being filtered. The filtered signal is transmitted to an amplitude detection unit 120 which in turn detects the maximum amplitude or a representative value close to the maximum amplitude, or the average amplitude, of a signal within a predefined measurement interval. At a final stage, a calculation unit 130 calculates a flying height of the reading head by using the above described maximum amplitude or representative value close thereto, or average amplitude, of the signal.

FIG. 2 is a diagram showing an outline of a hard disk structure for describing a calculation performed by the calculation unit 130. Note that the description herein adopts a planar magnetization hard disk as an example, the present invention, however, can be applied to other types of hard disks (e.g., a perpendicular magnetization hard disk) in lieu of being limited by the example.

A disk drive includes a reading head 200 and a platter (not shown herein). A reading head element 202, i.e., a part for an actual reading, a writing head element (not shown herein) and a head slider 204 linking to an arm supporting the head are connected to the reading head 200. The platter has on its surface a magnetic layer 210 on which a magnetic pattern of each polarity is written so as to correspond to a bit "0" or "1". That is, an "N<–S" magnetization pattern 212 and an "S–>N" magnetization pattern 214 exist on the magnetic layer 210 shown in FIG. 2, with each magnetic field being oriented in the positive direction or negative direction of the relative running direction of the head and magnetic layer. A spot where the "N<–S" magnetization pattern 212 and "S–>N" magnetization pattern 214 face each other in the same polarity corresponds to a bit "1" and the other spot corresponds to a bit "0". Furthermore, a transition place 216 exists between the "N<–S" magnetization pattern 212 and "S–>N" magnetization pattern 214 (note that the length of the transition place 216 (i.e., a transition length) is exaggeratingly drawn in FIG. 2 for a comprehensible description). The transition place 216 is a total of a transition part (with the length of a) existing on the edge of the "N<–S" magnetization pattern 212 and a transition part (with the length of a) existing on the edge of the "S–>N" magnetization pattern 214, hence the transition length is 2a. Note that although the length of each magnetization pattern is delineated as constant for simplicity, the actual lengths may be different for respective polarity patterns. Meanwhile, other definitions are: δ for a thickness of the magnetic layer 210, d for the distance (i.e., a magnetic spacing) from the reading head element 202 to the center of a thickness of the magnetic layer 210, and a head flying height FH for the distance from the reading head element 202 to the surface of the magnetic layer 210. Although the delineation of the above description omits a protective film and a lubricant on the magnetic film for simplicity, the actual d and FH add the thicknesses of those, exactly speaking.

A calculation of a head flying height according to the present invention is carried out by the following expression (1) using the above described definition:

$$FH = FH_0 + k \cdot \frac{n \cdot \lambda_n}{2\pi(n-1)} \cdot \ln\left\{\frac{(V_1/V_n)}{(V_1/V_n)_0}\right\} \quad (1)$$

; where k is a correction coefficient, n is the order of a harmonic component of the signal used for calculation, $\lambda_n$ is a wave length of an $n^{th}$ order harmonic component of the signal, $V_1$ is an amplitude of a linear harmonic component of the signal, $V_n$ is an amplitude of an nth order harmonic component of the signal. And $FH_0$ is an initial value of the distance (i.e., a reference flying height) between the head and magnetic layer, which can be defined as a flying height when the head is in touchdown with the magnetic layer (i.e., zero) for instance. And $(V_1/V_n)_0$ is an initial value of $V_1/V_n$ for a reference flying height. The correction coefficient k can also be obtained by an actual measurement, and a change of a value of k enables an application to a perpendicular magnetization hard disk.

A head flying height measurement apparatus provided by the present invention comprises:

a signal replay unit for replaying a signal from the reading head;

filter units, being connected to the signal replay unit, for filtering the replayed signal;

amplitude detection units, being connected to each of the filter units, for detecting a maximum amplitude or a representative value close thereto from the filtered replayed signal; and a calculation unit for calculating a flying height of the reading head within the disk drive by using the maximum amplitude, or the representative value close thereto, which is detected by the amplitude detection unit.

A program for carrying out a head flying height measurement method according to the present invention can be executed by a processor comprised by a disk drive according to a preferred embodiment of the present invention, or can also be stored by an external storage apparatus 608 including the disk drive according to the embodiment of the present invention, followed by being stored in memory 602 and executed by a processor 600 as described later. A head flying height measurement program according to the present invention can be input by an input apparatus 604, or also be stored in a storage unit by way of a network connection apparatus 614.

An apparatus and the related method according to the present invention enable a measurement of a head flying height without requiring a specific-use magnetization pattern.

BRIEF DESCRIPTION OF THE DRAWINGS

FIG. 1 is an illustration relating to the principle of a measurement of a head flying height according to the present invention;

DESCRIPTION OF THE PREFERRED EMBODIMENTS

The following is a detailed description of the preferred embodiment of the present invention by referring to the accompanying drawings, the present invention, however, is no way limited by the present embodiment.

First Embodiment

Figure 2:
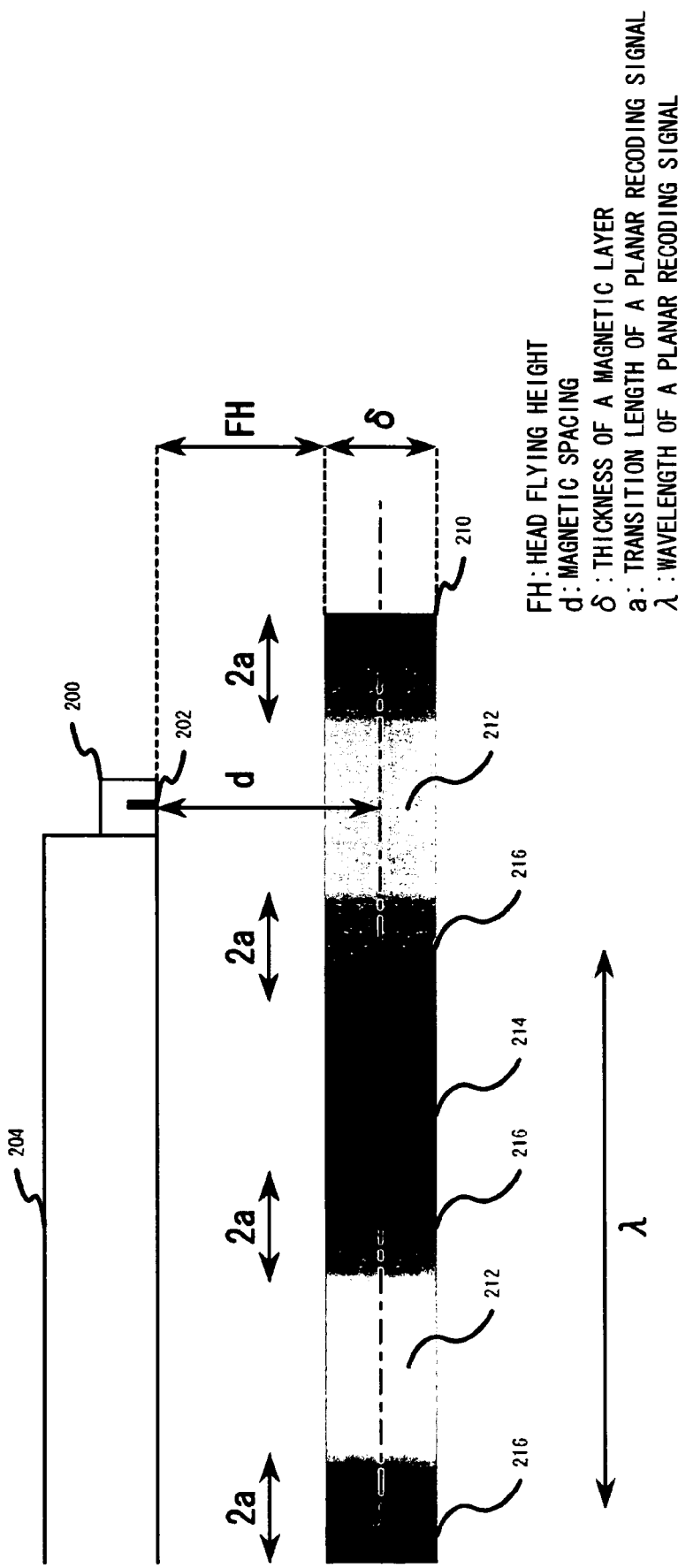
FIG. 2 is a diagram showing an outline of a hard disk structure.
Figure 3:
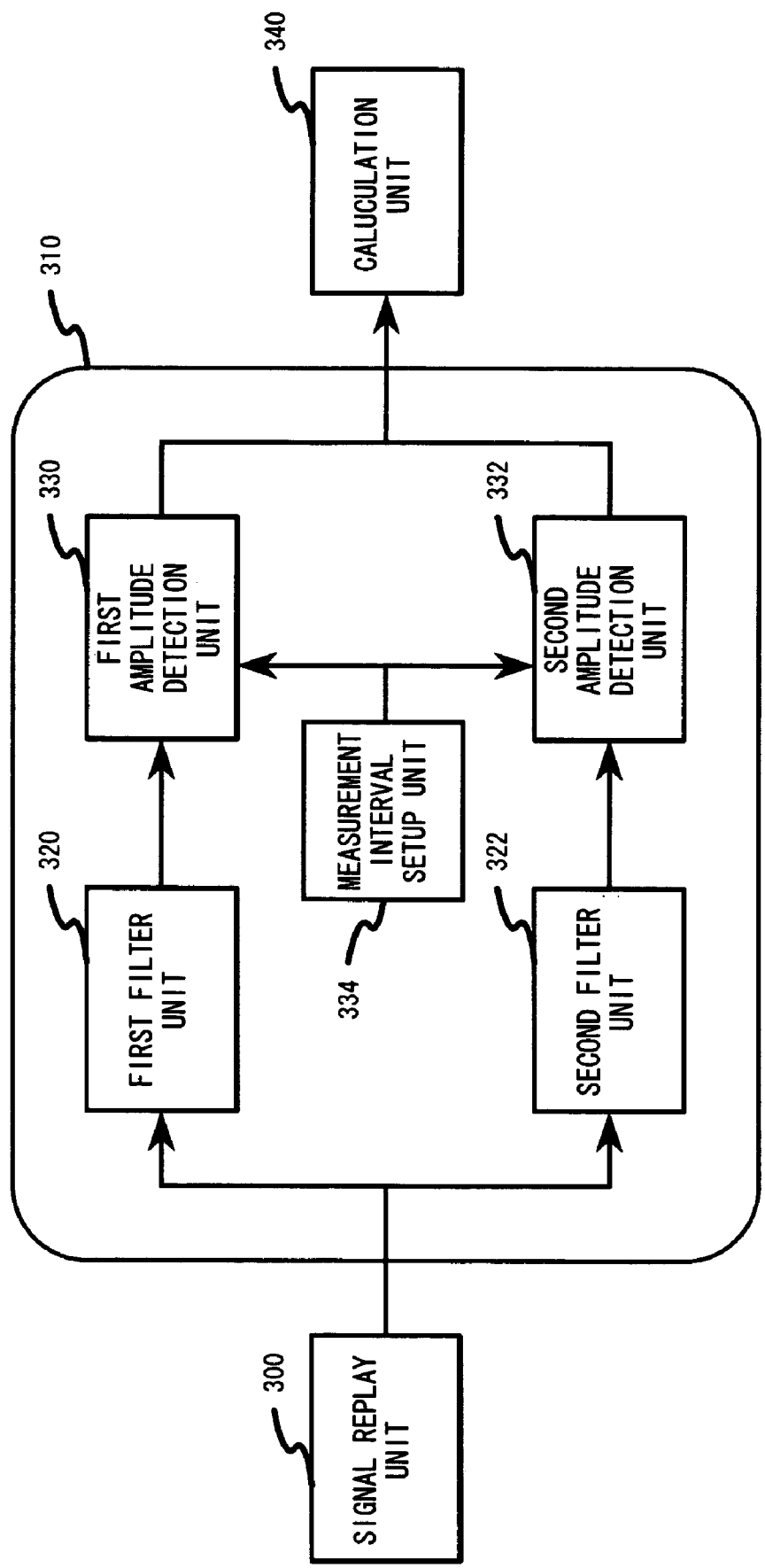
FIG. 3 is an illustration showing a configuration of a first embodiment according to the present invention.

FIG. 3 is an illustration showing a configuration of a first embodiment according to the present invention. A reading head within a disk drive reads information from a recording surface of a hard disk followed by a signal replay unit 300 receiving the information for replaying a signal. The signal is preferably servo information data (i.e., a servo signal) or user data recorded on the hard disk. The user data may preferably be replayed from a viewpoint of a freedom of selecting a frequency band, it does not limit the invention, however.

The above is followed by a process unit 310, which performs a filtering and a detection of a signal, receiving the replayed signal and carrying out processing. The process unit 310 includes a first filter unit 320 and a second filter unit 322, and further includes a first amplitude detection unit 330, a second amplitude detection unit 332 and a measurement interval setup unit 334. The first and second filter units 320 and 322 can be disposed for band-pass filters for the signal replay unit 300 by being parallelly connected thereto, in which case the center frequencies are preferably different from each other. Furthermore, the center frequency of the second filter unit 322 is preferably in the range of 1.5 and 5.0 times of that of the first filter unit 320. Note that direct current (DC) components are respectively removed from outputs of the above described first and second filter units. Filtered signals output from the first and second filter units 320 and 322 are respectively transmitted to the first and second amplitude detection units 330 and 332. The first amplitude detection unit 330 extracts a maximum value or a representative value close thereto, or an average value, of the signal passing through the first filter unit 320 according to a measurement interval predefined by the measurement interval setup unit 334. The measurement interval setup unit 334 is capable of defining a measurement interval by transmitting a reset signal at every predetermined time interval for taking a periodical measurement, or by transmitting a reset signal at every predefined interval of a hard disk for taking a periodical measurement, for instance. Meanwhile, the second amplitude detection unit 332 extracts a maximum value or a representative value close thereto, or an average value, of the signal passing through the second filter unit 322 according to a time interval predefined by the measurement interval setup unit 334.

Here, the above described "representative value close to a maximum value of an amplitude" means a value close to a maximum value of an amplitude measured within a predefined measurement interval. The representative value is utilized in the case of unable to remove noise if a measured maximum value is used as is, for instance. In order to calculate the representative value, each of the first and second amplitude detection units 330 and 332 is capable of including a filter through which a frequency range including for instance the representative value passes. Or, each of the first and second amplitude detection units 330 and 332 is capable of calculating the representative value by performing a moving average calculation. Alternatively, each of the first and second amplitude detection units 330 and 332 is capable of making, as the representative value, a value of a certain order which is discretionarily determinable when sorting each value of amplitudes measured within the predefined measurement interval in the descending order of amplitudes. Or, each of the units is capable of preparing a discretionary table, extracting a value corresponding to the table and thereby making it the representative value. Alternatively, each of the units is capable of calculating the representative value by using another discretionary method which is known in the relevant technical field.

In the case of using user data by replaying it, although an average value tends to have a variation because the user data is random and its contents change with the usage of a hard disk, a zone in which a specific frequency component appears exists in most cases of a sufficiently long span such as the length of one track circumference for instance. Therefore, a variation is suppressed to a materially ignorable level in a maximum value (or a representative value close thereto) obtained from a sufficiently long span and hence it is possible to use it stably for calculating a flying height. It is accordingly preferable to make a maximum value or a representative value close thereto a target for a detection which is performed by the first and second amplitude detection units 330 and 332, the present invention, however, is not limited by it.

The values detected by the first and second amplitude detection units 330 and 332 are respectively transmitted to a calculation unit 340 for calculating a head flying height for each predefined measurement interval. The calculation carried out by the calculation unit 340 is represented by the above noted expression (1). As described above, each of the amplitude detection units preferably cut out a mutually different frequency range of a replayed signal. Accordingly, the first amplitude detection unit 330 is capable of setting for cutting out the linear harmonic component of the replayed signal while the second amplitude detection unit 332 is capable of setting for cutting out the cubic harmonic component of the replayed signal, for example. This configuration corresponds to the above described case in which the "n" is equal to three ("3") in the expression (1). In this event, a calculation is performed according to the following expression (2) using the ratio of the linear harmonic component to cubic harmonic component:

$$FH = FH_0 + k \cdot \frac{3 \cdot \lambda_3}{4\pi} \cdot \ln\left\{\frac{(V_1/V_3)}{(V_1/V_3)_0}\right\} \quad (2)$$

Figure 4:
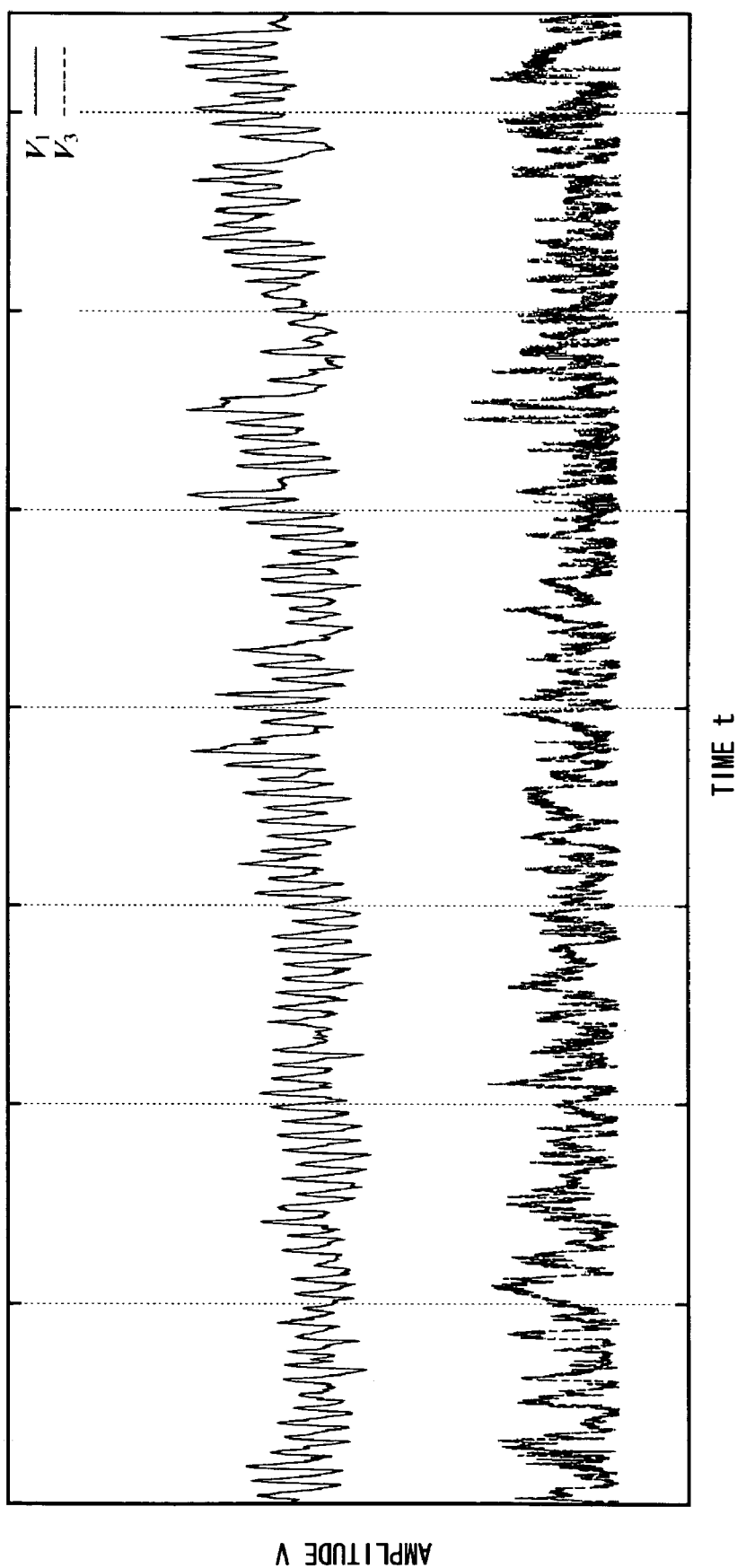
FIG. 4 is a graph exemplifying a replayed signal.

FIG. 4 exemplifies an amplitude $V_1$ of the linear component and an amplitude $V_3$ of the cubic component among the harmonic components of a replayed signal sectioned by a measurement time interval. The above described method is used for detecting a maximum amplitude of a representative value close thereto, or an average amplitude, for each section of the time interval as a parameter for calculating a head flying height.

Second Embodiment

Figure 5:
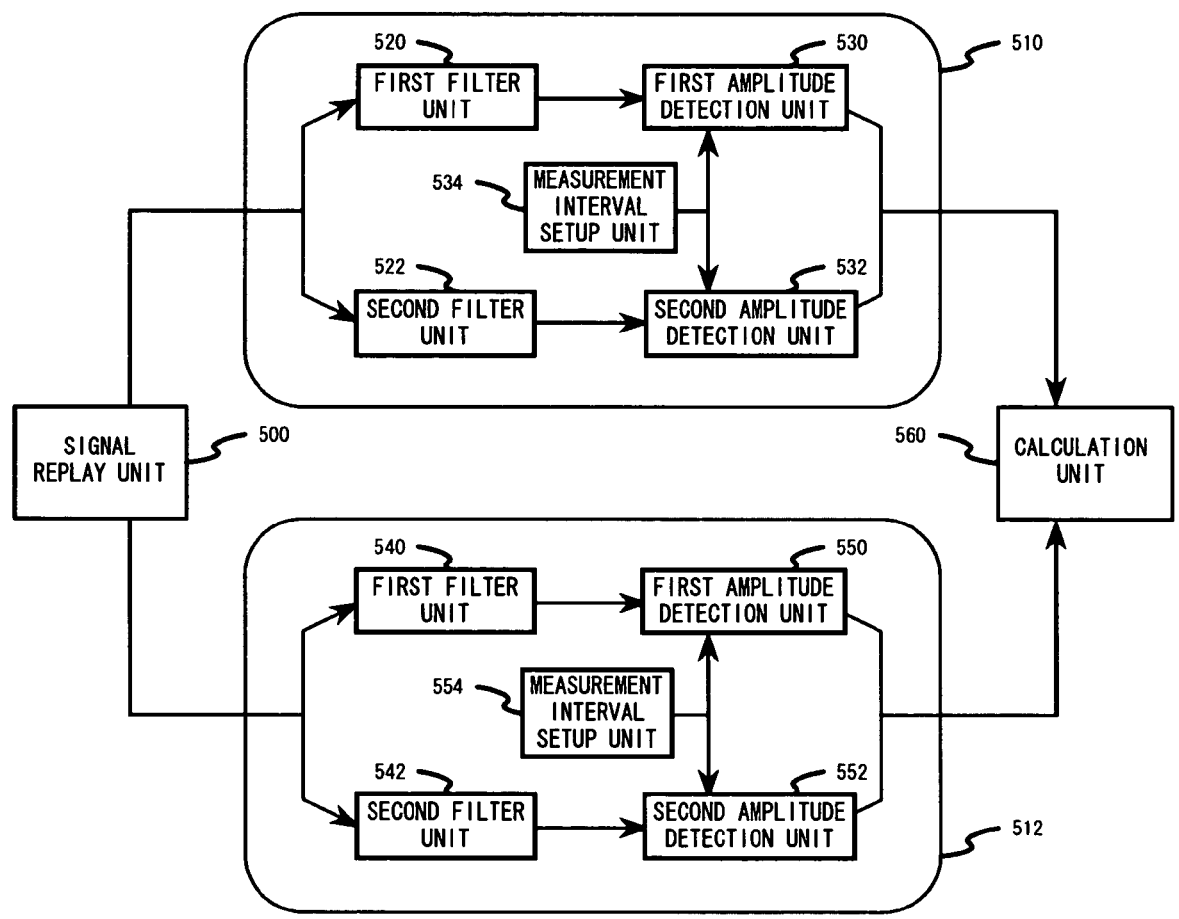
FIG. 5 is an illustration showing a configuration of a second embodiment according to the present invention.

FIG. 5 is an illustration showing a configuration of a second embodiment according to the present invention. The second embodiment is configured to connect two process units parallelly to a signal replay unit 500. A first process unit 510 and a second process unit 512 respectively include two filter units, two amplitude detection units and one measurement interval setup unit. These filter units, amplitude detection units and measurement interval setup unit allow mutually different setups. For instance, the first process unit 510 includes a first filter unit 520 and a second filter unit 522, both of which are band-pass filters, a center frequency of the second filter unit 522 is 3.0 times of one of the first filter unit 520. The respective values of $V_1$ and $V_3$ of the two filter units are transmitted to a first amplitude detection unit 530 and a second amplitude detection unit 532, respectively. Then, the first and second amplitude detection units 530 and 532 respectively detect maximum amplitudes within a measurement interval defined by a measurement interval setup unit 534 for example and transmit them to a calculation unit 560. Meanwhile, the second process unit 512 includes a first filter unit 540 and a second filter unit 542, both of which are band-pass filters, a center frequency of the second filter unit 542 is 3.0 times of one of the first filter unit 540. The respective values of $V_1$ and $V_3$ of the two filter units are transmitted to a first amplitude detection unit 550 and a second amplitude detection unit 552, respectively. Then, the first and second amplitude detection units 550 and 552 respectively detect average amplitudes within a measurement interval defined by a measurement interval setup unit 554 for example and transmit them to a calculation unit 560.

The calculation unit 560 can be configured to compare the parameters obtained from the first and second process units 510 and 512, and selectively use the value from the first process unit 510 providing the maximum amplitude in higher priority if the comparison brings forth a judgment that the signal contains a large amount of noise, whereas use the value from the second process unit 512 providing the average amplitude if the comparison brings forth a judgment that the signal contains a small amount of noise, for instance. A configuration may be such that the ratio of center frequencies of filters included by the first and second process units 510 and 512 can also be changed discretionarily so that the first process unit 510 outputs the ratio of $V_1$ to $V_3$ and the second process unit 512 outputs the ratio of $V_1$ to $V_5$, for example.

Figure 6:
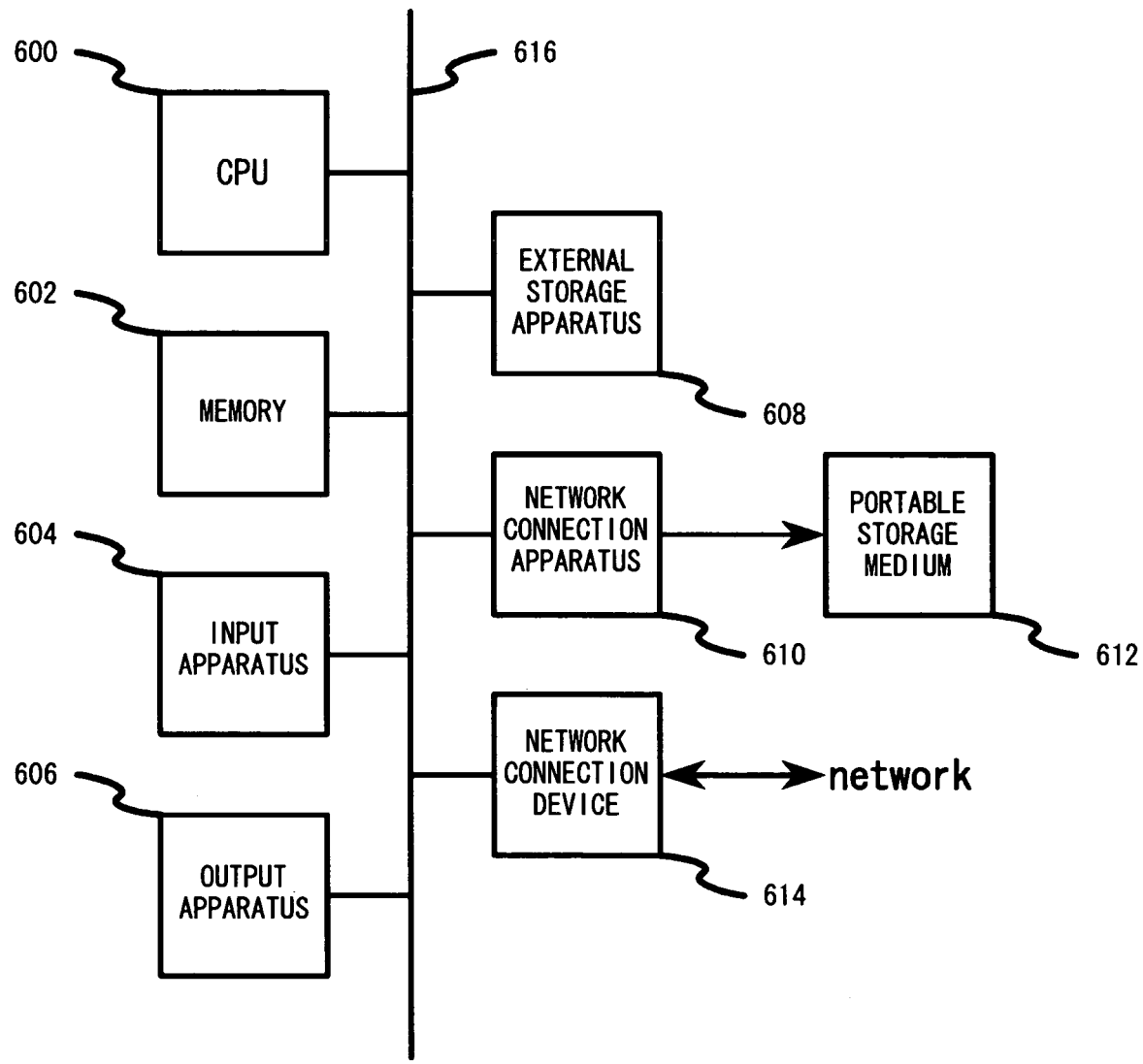
FIG. 6 is an illustration of a hardware configuration for executing a program according to the present invention.

FIG. 6 is an illustration of a hardware configuration for executing a program according to the present invention. In this example, a processor 600, memory 602, an input apparatus 604, an output apparatus 606, an external storage apparatus 608 including a disk drive according to the preferred embodiment of the present invention and a network connection apparatus 610 are interconnected by a bus 612. A program for implementing a method according to the present invention can be stored in the external storage apparatus 608 including a disk drive according to the preferred embodiment of the present invention. And the hardware can be connected to a network by way of the network connection apparatus 610, so as to input and output the program according to the present invention via the input apparatus 604 and output apparatus 606. Alternatively, a processor included in the external storage apparatus 608 including a disk drive according to the preferred embodiment of the present invention also is capable of executing the program implementing the method according to the present invention. In this case, the processing can be carried out independently from a computer which is external to the disk drive according to the preferred embodiment of the present invention.

Note that the filter unit 110 may be configured to perform an analog to digital (A/D) conversion of a replayed signal and apply a Fourier conversion thereto for detecting an amplitude of each frequency without equipping a physical band-pass filter. Note also that the above description takes the case of recording a digital signal to a hard disk, the present invention, however, can also be applied to a case of recording an analog signal thereto.

The apparatus, method and program according to the present invention enable a measurement of a head flying height without requiring a specific-use magnetization pattern.

What is claimed is:

1. A head flying height measurement apparatus for use within a disk drive including a reading head, comprising:
   a signal replay unit for replaying a signal from the reading head;
   filter units, being connected to the signal replay unit, for filtering the replayed signal;
   amplitude detection units, being connected to each of the filter units, for detecting a maximum amplitude or a representative value close to the maximum amplitude from the filtered replayed signal; and
   a calculation unit for calculating a flying height of the reading head within the disk drive by using the maximum amplitude or the representative value close to the maximum amplitude, which is detected by the amplitude detection unit, and wherein
   an interval for detecting said maximum amplitude or the representative value close to the maximum amplitude is equal to or greater than one sector interval of said hard disk.

2. The head flying height measurement apparatus according to claim 1, wherein
   said filter units includes a first and a second filter units, which are connected to said signal replay unit, for filtering said replayed signal, and
   said amplitude detection units includes a first amplitude detection unit, being connected to the first filter unit, for detecting a first maximum amplitude or a representative value close to the first maximum amplitude, or an average amplitude, from the filtered replayed signal, and includes a second amplitude detection unit, being connected to the second filter unit, for detecting a second maximum amplitude or a representative value close to the second maximum amplitude from the filtered replayed signal, wherein said calculation unit calculates a flying height of said reading head within said disk drive by using the first maximum amplitude or the representative value close to the first maximum amplitude detected by the first amplitude detection unit and using the second maximum amplitude or the representative value close to the second maximum amplitude detected by the second amplitude detection unit.

3. The head flying height measurement apparatus according to claim 1, wherein said signal replay unit replays and uses servo information data or user data of said hard disk read by said reading head.

4. The head flying height measurement apparatus according to claim 2, wherein said first. filter unit is parallelly connected to said second filter unit.

5. The head flying height measurement apparatus according to claims 1, wherein said filter units are band-pass filter.

6. The head flying height measurement apparatus according to claim 2, wherein said first and said second filter units are band-pass filters, and a central frequency of the second filter unit is in the range of 1.5 and 5.0 times of that of the first filter unit.

7. The head flying height measurement apparatus according to claim 3, wherein said first and said second filter units are band-pass filters, and a central frequency of the second filter unit is in the range of 1.5 and 5.0 times of that of the first filter unit.

8. A head flying height measurement apparatus for use within a disk drive including a reading head, comprising:

a signal replay unit for replaying a signal from the reading head;

filter units, being connected to the signal replay unit, for filtering the replayed signal;

amplitude detection units, being connected to each of the filter units, for detecting an average amplitude from the filtered replayed signal; and a calculation unit for calculating a flying height of the reading head within the disk drive by using the average amplitude which is detected by the amplitude detection unit, and wherein an interval for detecting the average amplitude is equal to or greater than one sector interval of a hard disk.

9. A disk drive, including:

a signal replay unit for replaying a signal from a reading head;

filter units, being connected to the signal replay unit, for filtering the replayed signal;

amplitude detection units, being connected to each of the filter units, for detecting a maximum amplitude or a representative value close to the maximum amplitude from the filtered replayed signal; and a calculation unit for calculating a flying height of the reading head within the disk drive by using the maximum amplitude, or the representitive value close to the maximum amplitude, which is detected by the amplitude detection unit, and wherein an interval for detecting the maximum amplitude or the representative value close to the maximum amplitude is equal to or greater than one sector interval of the disk drive.

10. A disk drive, including:

a signal replay unit for replaying a signal from a reading head;

filter units, being connected to the signal replay unit, for filtering the replayed signal;

amplitude detection units, being connected to each of the filter units, for detecting an average amplitude from the filtered replayed signals; and a calculation unit for calculating a flying height of the reading head within the disk drive by using the average amplitude which is detected by the amplitude detection unit, and wherein an interval for detecting the average amplitude is equal to or greater than one sector interval of the disk drive.

11. A head flying height calculation method for calculating a flying height of a reading head within a disk drive from a signal recorded therein by means of calculation by an expression, that is:

$$FH = FH_0 + k \cdot \frac{n \cdot \lambda_n}{2\pi(n-1)} \cdot \ln\left\{\frac{(V_1/V_n)}{(V_1/V_n)_0}\right\};$$

where FH is a flying height of the reading head, FHO is a reference flying height, k is a correction coefficient, n is the order of a harmonic component of the signal used for calculation, $\lambda_n$ is a wave length of an nth order harmonic component of the signal, V1 is an amplitude of a linear harmonic component of the signal, Vn is an amplitude of an nth order harmonic component of the signal, $(V1/Vn)_0$ is a value of V1/Vn for a reference flying height.

12. The head flying height calculation method according to claim 11, wherein said n is equal to 3.

13. The head flying height calculation method according to claim 11, wherein said signal is replayed servo information data or replayed user data.

14. The head flying height calculation method according to either one of claims 11, wherein said signal is filtered by using at least two band-pass filters in order to obtain said V1 and said Vn.

15. The head flying height calculation method according to either one of claims 11, wherein said V1 and Vn are a maximum amplitude or a representative value close to the maximum amplitude, or an average amplitude, of said signal.

* * * * *